July 19, 1927.

J. M. HOWE

BEARING MECHANISM

Filed Sept. 6, 1924

1,636,565

Inventor
James M. Howe
By Bates, Macklin, Goldrick & Teare
Attorneys

Patented July 19, 1927.

1,636,565

UNITED STATES PATENT OFFICE.

JAMES M. HOWE, OF CLEVELAND HEIGHTS, OHIO, ASSIGNOR TO THE MURRAY MANUFACTURING COMPANY, OF CLEVELAND, OHIO, A CORPORATION OF MICHIGAN.

BEARING MECHANISM.

Application filed September 6, 1924. Serial No. 736,223.

This invention is directed to improvements in bearing construction and has for its general object the provision of a resiliently mounted bearing adapted to support a rotatable member such as an axle or shaft.

A further object of my invention is the provision of an economical resiliently mounted bearing construction adaptable for use in supporting the shaft of a toy vehicle having a resiliently mounted body.

Other objects of my invention will hereinafter be set forth in the following description which refers to the accompanying drawings illustrating a preferred form thereof. The essential characteristics are summarized in the claims.

Figure 1:
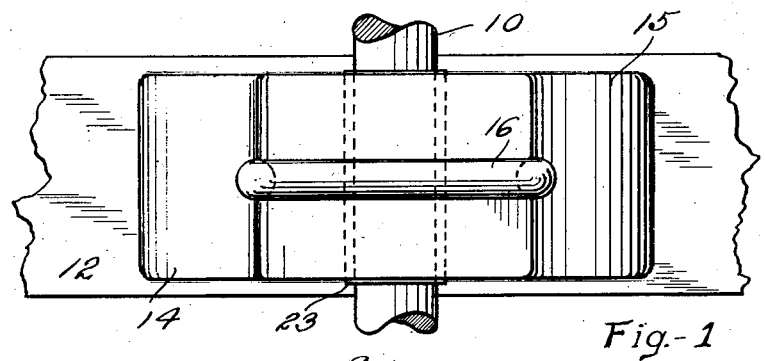
Figure 2:
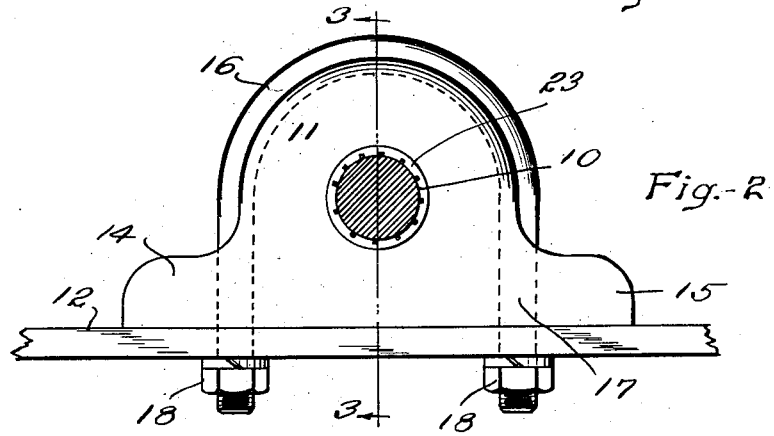
Figure 3:
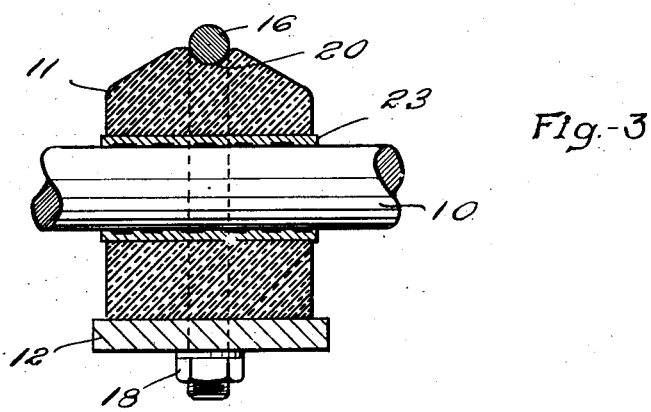

In the drawing, Fig. 1 is a plan view of my bearing construction mounted upon a leaf spring of a vehicle; Fig. 2 is a side elevation of the bearing construction and Fig. 3 is a cross-sectional elevation taken substantially along the line 3—3 of Fig. 2.

My invention contemplates the provision of a resilient means in the nature of a cushion for a tubular journal comprising a bearing for a rotatable member such as a shaft. As shown in the drawings, a bearing journal 10 may be mounted upon a block 11 comprising both a bearing bracket and a cushion for the journal sleeve whereby any unalignment of a bearing journal 10, by reason of a deflecting movement of the supporting spring leaf 12, will permit the journal member to align with the journal member of a similar bearing mounted on another leaf spring, not shown. The block 11 may be formed of any suitable resilient material preferably a block of molded rubber whereby the journal may be cast in the block when the rubber is being molded and cured. If desired the block may be bored and the journal inserted in the bore, the bore being of less diameter than the journal whereby it may be prevented from endwise movement when pressed into the bore of the block. The block is preferably provided with flanging portions 14 and 15 to increase the base or supporting area of the block.

The block may be maintained in engagement with the spring leaf 12 in any suitable manner, preferably in the manner shown in the drawings where the securing means comprises a U-shaped member 16 having the bent portion thereof seating in a groove 20 formed in the upper portion of the block. The legs 17 thereof extending through openings in the block which are aligned with openings formed in the spring 12 whereby nuts 18 may engage the protruding ends of the legs of the member 16 to secure the block to the spring. The journal member 10 may have the inner bearing surface thereof suitably slotted as shown at 23. The slot may be filled with graphite or other anti-friction substance whereby the bearing is self-lubricating thus eliminating the necessity for the use of oil which would be detrimental to the life of the resilient block 11.

It will be understood that the block may be formed of other material than rubber and may be of a shape other than the one shown in the drawings, the particular shape shown being chosen merely for convenience in illustration, and adaptation to a leaf spring.

Having thus described my invention, I claim:

1. In combination a leaf spring for a vehicle, an axle and a sleeve bearing directly engaging the same to support it, and means for supporting the sleeve to allow a weaving movement between the spring and the axle, comprising a block of resilient material in which the sleeve is embedded, and means penetrating the block on either side of the sleeve and spaced apart from the sleeve by said resilient material and arranged to clamp the block flat against the spring.

2. In combination a rotatable member, a journal sleeve, a supporting member for the sleeve comprising a rubber block having a wide base and a U-shaped member engaging the molded rubber member exteriorly thereof above the block, the legs of the U-shaped member extending through the rubber and engaging the supporting member.

3. In combination a rotatable member, a bearing therefor comprising a journal sleeve, having the bearing surface intersticed with anti-friction material filling the interstices, means supporting the sleeve comprising a resilient block of material having a wide base and means extending around the sleeve and through the block for securing the bearing to a supporting means.

4. A shaft bearing comprising a bracket formed of resilient material and having a central body portion, a substantially flat base and outwardly extending flange portions, the body portion having a continuous groove extending over the top and sides thereof, and the flanges having through openings in registration with the ends of the groove, a U-shaped member extending along the groove and into the openings and having means for clamping the bracket to a base, and a sleeve embedded in the body portion adapted to receive and directly support a shaft.

In testimony whereof, I hereunto affix my signature.

JAMES M. HOWE.